United States Patent
Marion et al.

(10) Patent No.: US 7,890,952 B2
(45) Date of Patent: Feb. 15, 2011

(54) AUTONOMIC PEER-TO-PEER COMPUTER SOFTWARE INSTALLATION

(75) Inventors: Neal Richard Marion, Georgetown, TX (US); Shawn Patrick Mullen, Buda, TX (US); George Francis Ramsay, III, Elgin, TX (US); Gerald James Tesauro, Croton-on-Hudson, NY (US); James Stanley Tesauro, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1030 days.

(21) Appl. No.: 10/960,572

(22) Filed: Oct. 7, 2004

(65) Prior Publication Data

US 2006/0080658 A1 Apr. 13, 2006

(51) Int. Cl.
*G06F 9/445* (2006.01)
(52) U.S. Cl. ............... 717/176; 717/124; 717/174; 717/177; 717/178
(58) Field of Classification Search ............ 714/38; 717/168–178
See application file for complete search history.

(56) References Cited

U.S. PATENT DOCUMENTS

| | | | |
|---|---|---|---|
| 5,155,847 A | * | 10/1992 | Kirouac et al. ............... 709/221 |
| 5,799,187 A | | 8/1998 | McBrearty |
| 6,199,204 B1 | | 3/2001 | Donohue |
| 6,202,207 B1 | | 3/2001 | Donohue |
| 6,327,617 B1 | | 12/2001 | Fawcett |
| 6,341,321 B1 | | 1/2002 | Glassen et al. |

(Continued)

OTHER PUBLICATIONS

Turcan et al. "Intelligent Software Delivery Using P2P", 2002, Proceedings of the Second International Conference on Peer-to-Peer Computing.*

(Continued)

*Primary Examiner*—Lewis A Bullock, Jr.
*Assistant Examiner*—Jue Wang
(74) *Attorney, Agent, or Firm*—Thomas E. Tyson; Matthew Talpis (57) ABSTRACT

Methods, systems, and products are provided for peer-to-peer computer software installation. Embodiments include receiving, by an observing install agent running on an observing host from a test install agent running on a test host, performance information describing the performance of software installed on the test host; determining, by the observing install agent, whether the performance information meets performance criteria for the observing host; and if the performance information meets the performance criteria for the observing host, installing the software on the observing host. In some embodiments, determining, by the observing install agent, whether the performance information meets performance criteria for the observing host is carried out by determining, whether the performance information meets performance criteria for the observing host in dependence upon a rule.

20 Claims, 6 Drawing Sheets

U.S. PATENT DOCUMENTS

| | | | |
|---|---|---|---|
| 6,401,238 B1* | 6/2002 | Brown et al. | 717/177 |
| 6,453,468 B1* | 9/2002 | D'Souza | 717/168 |
| 6,487,718 B1* | 11/2002 | Rodriguez et al. | 717/177 |
| 6,782,527 B1* | 8/2004 | Kouznetsov et al. | 717/103 |
| 6,862,696 B1* | 3/2005 | Voas et al. | 714/38 |
| 7,020,875 B2* | 3/2006 | Zweifel et al. | 717/168 |
| 7,162,538 B1* | 1/2007 | Cordova | 709/238 |
| 7,178,144 B2* | 2/2007 | Melchione et al. | 717/172 |
| 7,216,343 B2* | 5/2007 | Das et al. | 717/168 |
| 7,584,261 B1* | 9/2009 | Teodosiu et al. | 709/217 |
| 2002/0091807 A1* | 7/2002 | Goodman | 709/221 |
| 2004/0210653 A1* | 10/2004 | Kanoor et al. | 709/223 |
| 2004/0261070 A1* | 12/2004 | Miller et al. | 717/170 |
| 2005/0066019 A1* | 3/2005 | Egan et al. | 709/223 |
| 2005/0257199 A1* | 11/2005 | Johansson et al. | 717/126 |

OTHER PUBLICATIONS

U.S. Appl. No. 10/630,257, filed Jul. 30, 2003, Anderson et al.

IBM Standard Software Installer (ISSI); Research Disclosure n 439, Article 140; Nov. 2000; pp. 2023-2026; US.

Extending the Concepts of Suite and Application Beans to the J2EE Framework; Research Disclosure n 453, Article 151; Jan. 2002; p. 135; US.

* cited by examiner

AUTONOMIC PEER-TO-PEER COMPUTER SOFTWARE INSTALLATION

BACKGROUND OF THE INVENTION

1. Field of the Invention

The field of the invention is data processing, or, more specifically, methods, systems, and products for peer-to-peer computer software installation.

2. Description of Related Art

Autonomic controls of self regulating biological systems use motor neurons to send indirect messages to organs at a sub-conscious level. In humans, these messages regulate temperature, breathing, and heart rate without conscious thought. "Autonomic computing" is a systematic view of computing modeled after such self regulating biological systems. Autonomic computing is radical change in the development, management, and maintenance of computer systems. This new paradigm shifts the fundamental definition of the technology age from one of computing, to one defined by data. Access to data from multiple, distributed sources, in addition to traditional centralized storage devices will allow users to transparently access information when and where they need it. Autonomic computing systems focus on developing distributed networks that are largely self-managing, self-diagnostic, and transparent to users. Autonomic systems typically have the following characteristics:

Flexibility. Autonomic systems often support platform- and device-agnostic approaches to problems.

Accessibility. Autonomic systems are typically always on.

Transparency. Autonomic systems operate with minimal user intervention.

Conventional software installation techniques are not very autonomic and often require intense user intervention. System administrators often manually install software on each computer in a networked environment. Furthermore, system administrators are often required to determine whether software on one or more computers in a network is performing adequately before installing the same software on other computers in the network.

Some automated software installation techniques exist. However, such techniques often rely on a single central server to determine whether to install software onto a computer. Relying on a central server to determine whether to install software onto computers on a network, leaves the system vulnerable to failure if the central server crashes. There is therefore an ongoing need for methods, systems, and products software installation that are more autonomic in their approach.

SUMMARY OF THE INVENTION

Methods, systems, and products are provided for peer-to-peer computer software installation. Embodiments include receiving, by an observing install agent running on an observing host from a test install agent running on a test host; performance information describing the performance of software installed on the test host; determining, by the observing install agent, whether the performance information meets performance criteria for the observing host; and if the performance information meets the performance criteria for the observing host, installing the software on the observing host.

In many embodiments, receiving performance information describing the performance of software installed on the test host includes sending, by an observing install agent running on an observing host to a test install agent running on a test host, a performance information request message, and receiving, by an observing install agent running on an observing host from a test install agent running on a test host, a performance information response message. In some embodiments, receiving performance information describing the performance of software installed on the test host includes broadcasting a performance information message to a plurality of observing install agent running on a plurality of observing hosts. In some embodiments, determining, by the observing install agent, whether the performance information meets performance criteria for the observing host is carried out by determining, whether the performance information meets performance criteria for the observing host in dependence upon a rule.

Many embodiments also include installing software on the test host and maintaining, by the test install agent, performance information describing performance of software installed on the test host. In typical embodiments, maintaining, by the test install agent, performance information describing performance of software installed on the test host is carried out by identifying an error in the performance of the software and recording a description of the error. In many embodiments, installing the software on the observing host includes downloading the software from the test host.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Introduction

The present invention is described to a large extent in this specification in terms of methods for peer-to-peer computer software installation. Persons skilled in the art, however, will recognize that any computer system that includes suitable programming means for operating in accordance with the disclosed methods also falls well within the scope of the present invention. Suitable programming means include any means for directing a computer system to execute the steps of the method of the invention, including for example, systems comprised of processing units and arithmetic-logic circuits coupled to computer memory, which systems have the capability of storing in computer memory, which computer memory includes electronic circuits configured to store data and program instructions, programmed steps of the method of the invention for execution by a processing unit.

The invention also may be embodied in a computer program product, such as a diskette or other recording medium, for use with any suitable data processing system. Embodiments of a computer program product may be implemented by use of any recording medium for machine-readable information, including magnetic media, optical media, or other suitable media. Persons skilled in the art will immediately recognize that any computer system having suitable programming means will be capable of executing the steps of the method of the invention as embodied in a program product. Persons skilled in the art will recognize immediately that, although most of the exemplary embodiments described in this specification are oriented to software installed and executing on computer hardware, nevertheless, alternative embodiments implemented as firmware or as hardware are well within the scope of the present invention.

Autonomic Peer-to-Peer Computer Software Installation

Figure 1:
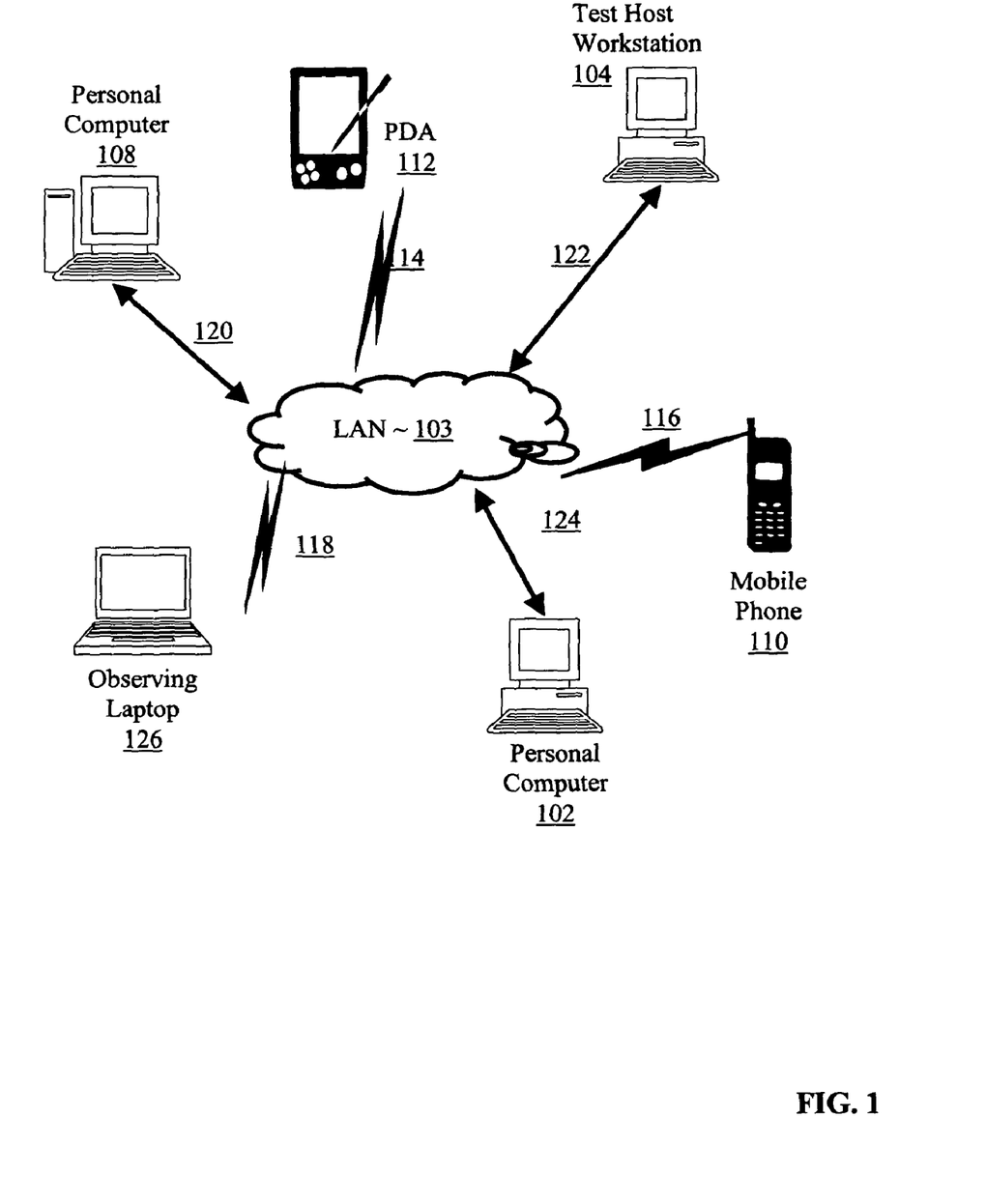
FIG. 1 depicts an exemplary data processing system capable of peer-to-peer software installation according to embodiments of the present invention.

Exemplary methods, systems, and products for peer-to-peer computer software installation are now explained with reference to the accompanying drawings, beginning with FIG. 1. FIG. 1 depicts an exemplary data processing system capable of peer-to-peer software installation according to embodiments of the present invention. The system of FIG. 1 includes a number of computers connected for data communications in networks. The data processing system of FIG. 1 includes local area network ("LAN") (103) of a plurality of computers each of which has installed upon it an install agent. Each of the computers of the system of FIG. 1 has installed upon it an install agent. An install agent is software running on a computer host that is capable of installing software on its host and maintaining performance information describing the performance of the installed software. Install agents of the present invention are also typically capable of requesting performance information from other hosts describing the performance of software installed on those hosts and responding to similar requests from other hosts. Install agents of the present invention are also typically capable of determining whether the performance information describing software installed on another host meets its own performance criteria, and installing the software if the performance information meets its performance criteria. In carrying out these functions, install agents of the present invention operate both as a test install agent and as an observing install agent. When an install agent installed on one of the computers of FIG. 1 is operating as a test install agent, in this specification, the install agent's host computer is called a test host. Similarly, when an install agent installed on one of the hosts of FIG. 1 is operating as an observing install agent, the host computer is called an observing host.

When operating as a test install agent, the install agent is capable generally of installing software on the test host and maintaining, by the test install agent, performance information describing performance of software installed on the test host. When operating as an observing install agent, the install agent is capable generally of receiving, from another test install agent running on another test host, performance information describing the performance of software installed on the test host, determining whether the performance information meets performance criteria for the observing host, and installing the software on the observing host if the performance information meets the performance criteria for the observing host.

In the example of FIG. 1, several exemplary hosts are connected to a LAN (103) including a PDA (112), a computer workstation (104), a mobile phone (110), personal computer (108), a personal computer (102) and a laptop (126). The network-enabled mobile phone (110) connects to the LAN (103) through a wireless link (116), the PDA (112) connects to the LAN (103) through a wireless link (114), and the laptop (126) connects to the LAN (103) through a wireless link (118). In the example of FIG. 1, the personal computer (108) connects to the LAN (103) through a wireline connection (120), the workstation (104) connects to the LAN (103) through a wireline connection (122), and the personal computer (102) also connects to the LAN (103) through a wireline connection (124). The network connection aspect of the architecture of FIG. 1 is only for explanation, not for limitation. In fact, systems for peer-to-peer computer software installation according to embodiments of the present invention may be connected as LANs, WANs, intranets, internets, the Internet, webs, the World Wide Web itself, or other connections as will occur to those of skill in the art. Such networks are media that may be used to provide data communications connections between various devices and computers connected together within an overall data processing system.

The example of FIG. 1 identifies the workstation (104) as a test host workstation and the laptop (126) as an observing host laptop. This designation is for clarity of explanation of peer-to-peer software installation only and not for limitations. As discussed above each of the hosts (108, 112, 104, 126, 102, and 110) of FIG. 1 are equally capable of operating as a test host and an observing host. The exemplary workstation (104) identified as a test host workstation and has an install agent installed upon it that is currently operating as a test install agent and is maintaining performance information describing performance of software installed on the workstation (104). The exemplary laptop (126) identified as an observing laptop has an install agent installed upon it that is currently operating as an observing install agent. The install agent on the laptop is capable generally of requesting from the test host workstation (104) performance information describing the performance of software installed on the test host workstation (104). The requested performance information typically describes software not yet installed on the observing laptop or updates not yet installed on the observing laptop for software that is currently installed and running on the test workstation. The observing install agent installed on the observing laptop in the example of FIG. 1 is also capable of receiving, from the test install agent running on the test host workstation (104), the performance information and determining whether the performance information meets performance criteria for the observing laptop. If the performance information meets the performance criteria for the observing laptop, the install agent running on the laptop of FIG. 1 is capable of downloading the software from the test host workstation (104) and installing the software.

When installing new software within a network, a system administrator may designate one or more install agents on one or more hosts as test install agents and designate other install agents operating on other hosts in a network as observing install agents. Alternatively, the system of FIG. 1 operates in a more autonomic fashion without requiring a system administrator to designate any install agent as a test install agent or an observing install agent. In such embodiments, each install agent operates simultaneously as a test install agent and a host install agent.

Figure 2:
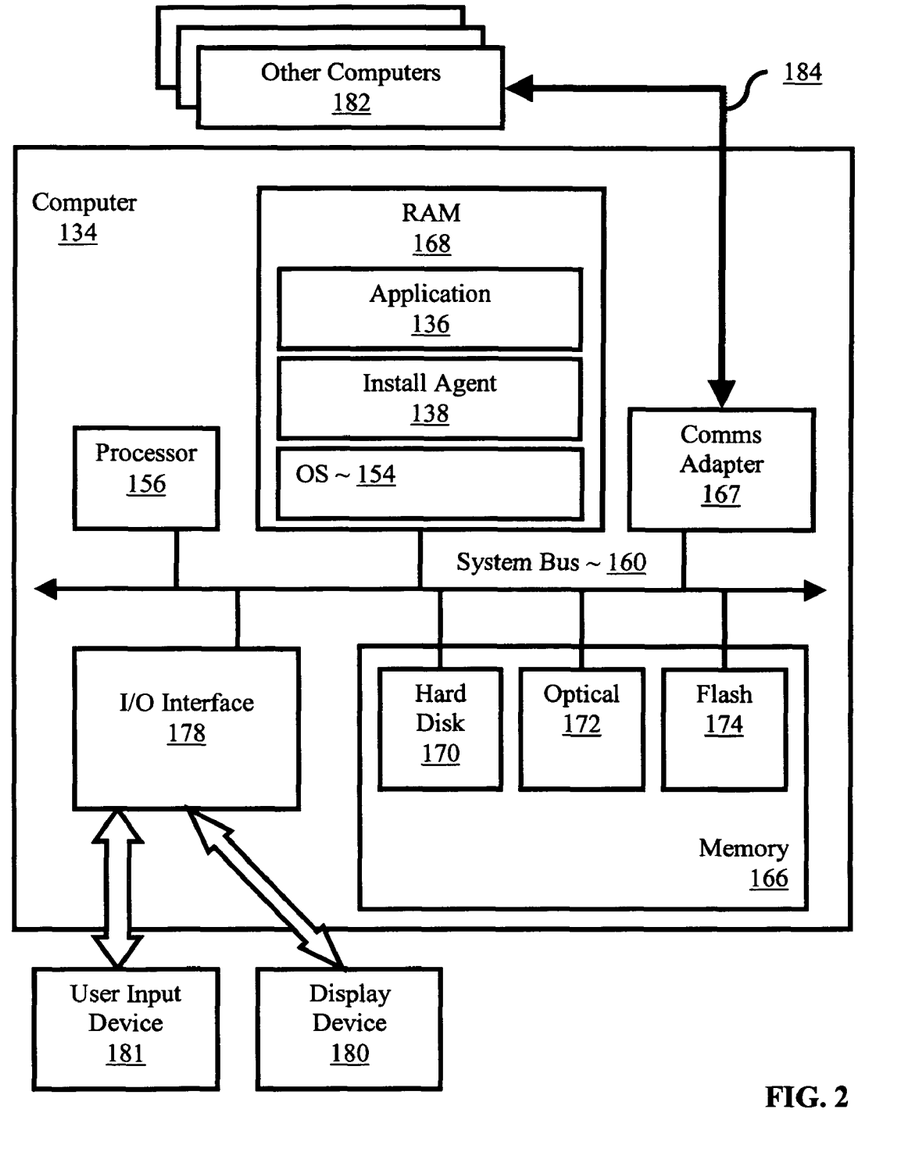
FIG. 2 sets forth a block diagram of automated computing machinery useful in peer-to-peer computer software installation according to embodiments of the present invention.

As mentioned above, peer-to-peer computer software installation in accordance with the present invention is generally implemented with computers, that is, with automated computing machinery. For further explanation, FIG. 2 sets forth a block diagram of automated computing machinery comprising a computer (134) useful in peer-to-peer computer software installation according to embodiments of the present invention. The computer (134) of FIG. 2 includes at least one computer processor (156) or 'CPU' as well as random access memory (168) ("RAM"). Stored in RAM (168) is an install agent (138) and a software application (136). The install agent (138) of FIG. 2 is capable of operating as a test install agent by installing the software application (136) on the host computer (134) and maintaining performance information describing performance of the software application (136). The install agent of (138) is also capable of operating as an observing install agent. When operating as an observing install agent, the install agent (138) of FIG. 2 is capable receiving, from another install agent running on another host computer, performance information describing the performance of software not yet installed on the host computer (134), determining whether the performance information meets performance criteria for the observing host computer (134), and installing the software on the observing host computer if the performance information meets the performance criteria for the observing host computer (134). The install agent of FIG. 2 is also capable of requesting the performance information of other host computers, responding to requests for performance information to other host computers, or periodically broadcasting performance information to a plurality of hosts on the LAN.

Also stored in RAM (168) is an operating system (154). Operating systems useful in computers according to embodiments of the present invention include Unix, Linux, Microsoft NT™, and many others as will occur to those of skill in the art. Operating system (154) in the example of FIG. 2 is shown in RAM (154), but many components of an operating system typically are stored in non-volatile memory (166) also.

The computer (134) of FIG. 2 includes non-volatile computer memory (166) coupled through a system bus (160) to a processor (156) and to other components of the computer. Non-volatile computer memory (166) may be implemented as a hard disk drive (170), optical disk drive (172), electrically erasable programmable read-only memory space (so-called 'EEPROM' or 'Flash' memory) (174), RAM drives (not shown), or as any other kind of computer memory as will occur to those of skill in the art.

The exemplary computer (134) of FIG. 2 includes a communications adapter (167) for implementing connections for data communications (184), including connections through networks, to other computers (182), including servers, clients, and others as will occur to those of skill in the art. Communications adapters implement the hardware level of connections for data communications through which local devices and remote devices or servers send data communications directly to one another and through networks.

The example computer of FIG. 2 includes one or more input/output interface adapters (178). Input/output interface adapters in computers implement user-oriented input/output through, for example, software drivers and computer hardware for controlling output to display devices (180) such as computer display screens, as well as user input from user input devices (181) such as keyboards and mice.

Figure 3:
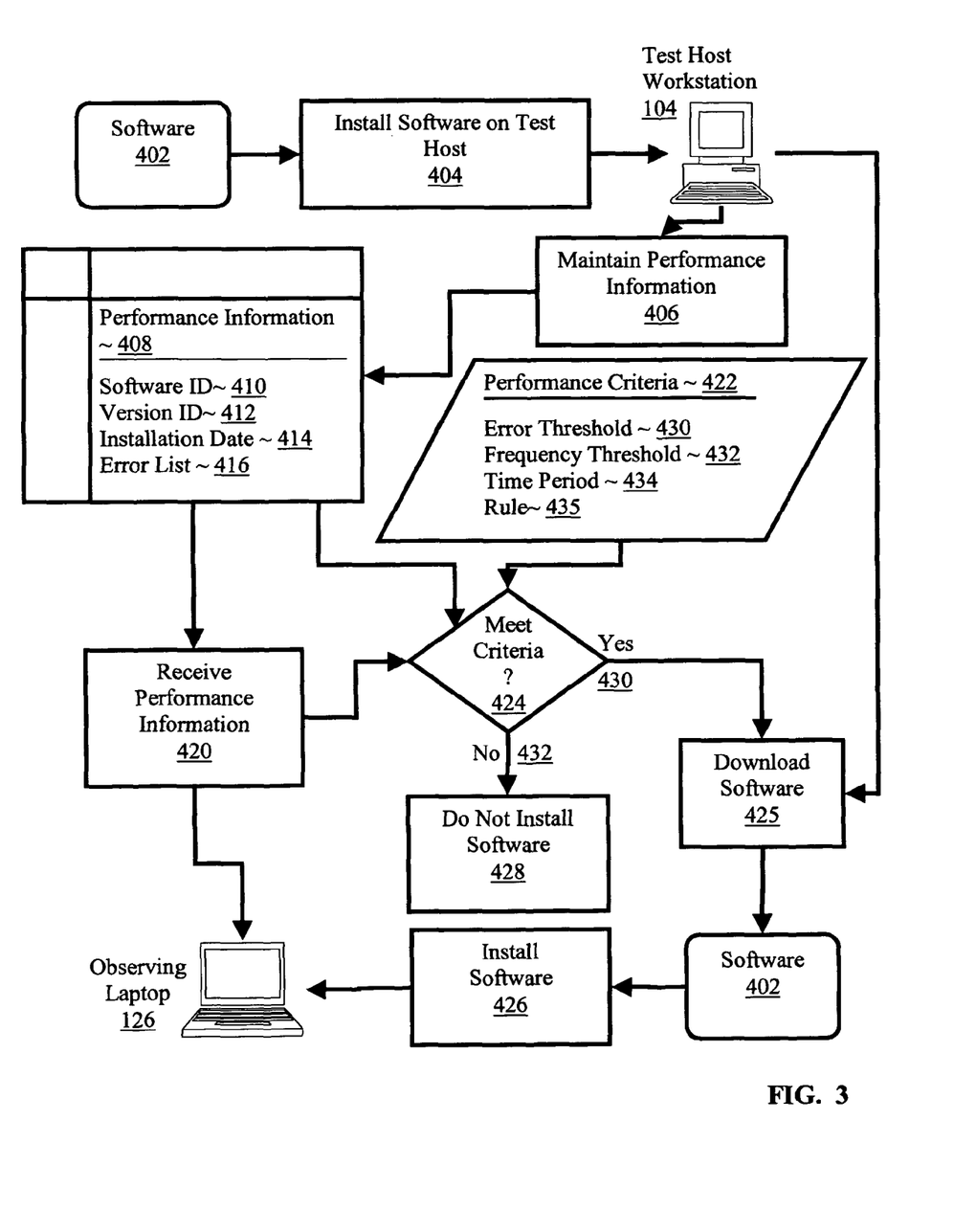
FIG. 3 sets forth a flow chart illustrating an exemplary method for peer-to-peer computer software installation according to embodiments of the present invention.

For further explanation, FIG. 3 sets forth a flow chart illustrating an exemplary method for peer-to-peer computer software installation according to embodiments of the present invention. The method of FIG. 3 includes installing (404) software (402) on the test host (104). Installing (404) software (402) on the test host (104) is typically carried out by a system administrator manually installing the system or by the method of FIG. 3 itself once the system of FIG. 3 has been operating for a period of time. Installing (404) software (402) on the test host (104) is often carried out by downloading to the test host (104) the software and an installation wizard designed for installation of the software and installing the software with the aid of the install wizard. Installing the software on the test host by use of an installation wizard is described for explanation and not for limitation. In fact, all methods of installing software are well within the scope of the present invention. In this specification, software (402) typically includes software installed on the test host, but not yet installed on the observing host, updates to software installed on the test host, but not yet installed on the observing host, as well as software or updates to software installed on the test host that is also currently installed on the observing host.

The method of FIG. 3 also includes maintaining (406), by the test install agent, performance information (408) describing performance of software (402) installed on test host (104). In this specification, performance information is any information useful in evaluation the performance of the software. Often performance information includes a description of errors encountered when running the software on its test host. In the example of FIG. 3, performance information describing performance of software installed on the test host is represented as a data structure including a software identification (410) uniquely identifying software installed on the test host. The exemplary performance information (408) of FIG. 3 contains only one field for software identification. This is for clarity of explanation and not for limitation. In fact, in many embodiments, performance information is represented as a single data structure containing data describing the performance of a plurality of software applications installed on the test host.

The exemplary performance information (408) of FIG. 3 also includes a software version identification (412) uniquely identifying the version of a particular software application installed on the test host. Version identification is particularly useful in identifying well-performing updates for software for installation on observing hosts. The exemplary performance information (408) of FIG. 3 also includes an installation date (414) identifying the date the software identified by the software identification and version identification was installed on the test host. The exemplary performance information (408) of FIG. 3 also includes an error list (416). The error list is typically a data structure containing a list of descriptions of errors encountered during the execution of the software on the test host. The error list also typically includes a date and time of the error.

Figure 4:
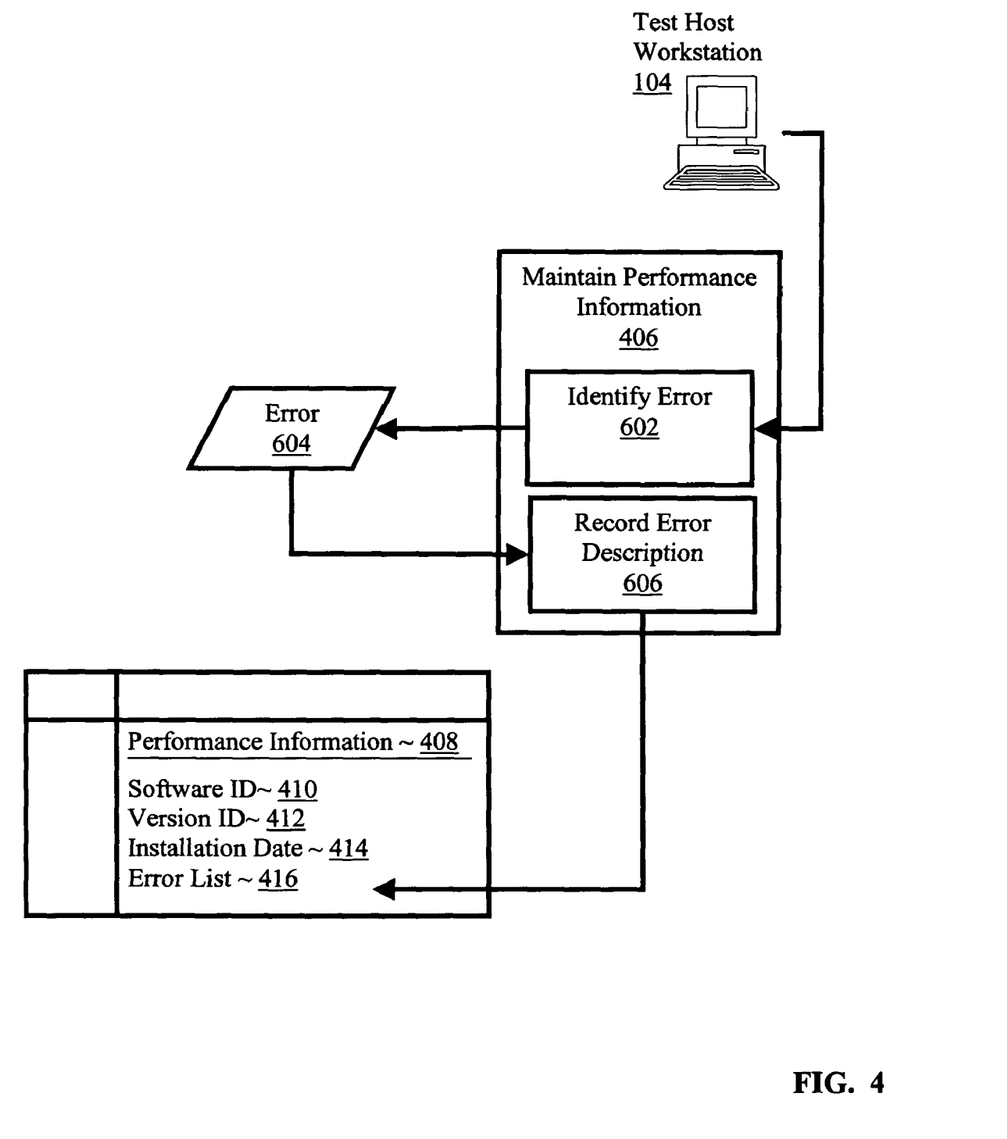
FIG. 4 sets forth a flow chart illustrating an exemplary method for maintaining performance information describing performance of software installed on the test host useful in implementing peer-to-peer computer software installation.

For further explanation, FIG. 4 sets forth a flow chart illustrating an exemplary method for maintaining (406), by the test install agent, performance information (408) describing performance of software installed on the test host useful in implementing the method of peer-to-peer software installation of FIG. 3. The method of FIG. 4 includes identifying (602) an error (604) in the performance of the software and recording (606) a description of the error (416) in a data structure representing performance information for the software. Many software applications provide for error logging in existing system procedures provided with the filesets of the software applications. One way of identifying (602) an error (604) in the performance of the software and recording (606) a description of the error (416) therefore may be achieved by modifying existing error logging functions provided in system procedures for the application to notify an install agent when making each error log entry. An install agent then records a description of the error and the date and time information associated with the error and the software causing the error in a data structure representing the performance information for the software.

When an error is severe enough to cause a program to crash, some applications provide mechanisms for creating a corefile. A corefile is a file that holds the state of the program at the moment it crashes. Corefiles often holds valuable clues as to the nature of the crash. Identifying (602) an error (604) in the performance of the software and recording (606) a description of the error (416) may therefore be carried out by scanning a corefile for conditions associated with particular errors and recording a description of such errors if such conditions are found. Scanning a corefile for conditions associated with particular errors can often reveal the instruction causing the error. In such cases, the instruction or a description of the instruction can also be recorded in the performance information.

Many operating systems, such as for example, the Unix operating system, also provide error logging functions for logging operating system level errors. Identifying (602) an error (604) in the performance of the software and recording (606) a description of the error (416) therefore may be achieved by modifying existing operating system level error logging functions to notify an install agent when making each error log entry. An install agent may receiving, from the operating system, a description of the error and the date and time of the error and record the description and date and time information in the performance information.

Continuing again with reference to FIG. 3: The method of FIG. 3 includes receiving (420), by an observing install agent running on an observing host (126) from a test install agent running on a test host (104), performance information (408) describing the performance of software (402) installed on the test host (104). One exemplary method of receiving (420) performance information (408) is described with reference to FIG. 5. For further explanation, FIG. 5 sets forth a flow chart illustrating an exemplary method for receiving (420 on FIG. 3) performance information (408). The method of FIG. 5 includes sending (502), by an observing install agent running on an observing host (126) to a test install agent running on a test host (104), a performance information request message (504). In some embodiments, a system administrator manually configures an install agent as an observing install agent and manually configures the observing install agent with the network addresses of one or more designated test hosts. In such embodiments, the observing install agent periodically sends one or more test hosts (104) a request message requesting their performance information. Alternatively, an observing host may instead be configured with list of network addresses of all the hosts on a network. In such embodiments, an install agent simultaneously operating as both an observing install agent and a test install agent may periodically send performance request message to all the other hosts on the LAN. In such embodiments, all the other hosts act as test install agents and send in response a performance response message containing their performance information.

Figure 5:
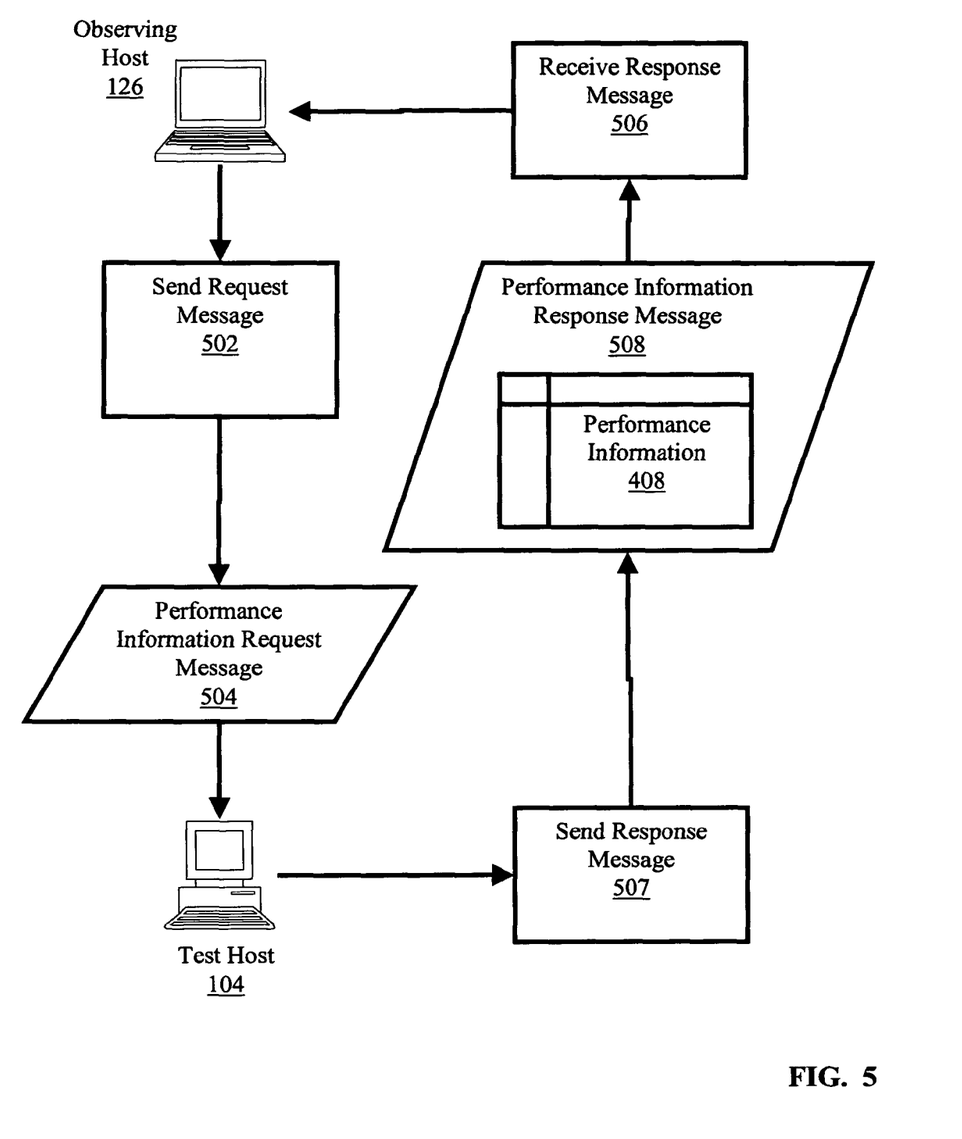
FIG. 5 sets forth a flow chart illustrating an exemplary method for receiving performance information useful in implementing peer-to-peer computer software installation.

The method of FIG. 5 also includes receiving (506), by an observing install agent running on an observing host (126) from a test install agent running on a test host (104), a performance information response message (508). In the method of FIG. 5, the performance information response message (508) contains performance information (408) describing the performance of the software installed on the test host. In some embodiments, a performance information request message may request performance information for specific software. In such embodiments, an install agent receiving such a request may determine if the identified software is installed on its host and if the install agent is maintaining performance information for the identified software. If the install agent is maintaining performance information for the identified software, the install agent on the host (104) sends (507) a performance response message (508) to the requesting observing host containing the performance information (408) describing the performance of the identified software.

In other embodiments, a performance information request message may request performance information, but may not identify specific software. In such embodiments, an install agent receiving such a request may respond by sending (507) a performance response message to the observing host containing the performance information (408) describing the performance of all the software installed on its host (104) for which performance information is maintained. A receiving observing install agent then determines if software or updates to software is installed on the test host that is not installed on the observing host. If such software is installed on the test host, a receiving observing install agent running on the observing host determines whether the performance information for such software meets performance criteria for the observing host. If the performance information meets its performance criteria, the install agent on the observing host may continue by downloading and installing the software.

Each install agent may be configured individually by a system administrator to periodically send a performance information request messages in host specific time intervals. Such individual configuration provides increased flexibility in the implementation of peer-to-peer software installation.

Figure 6:
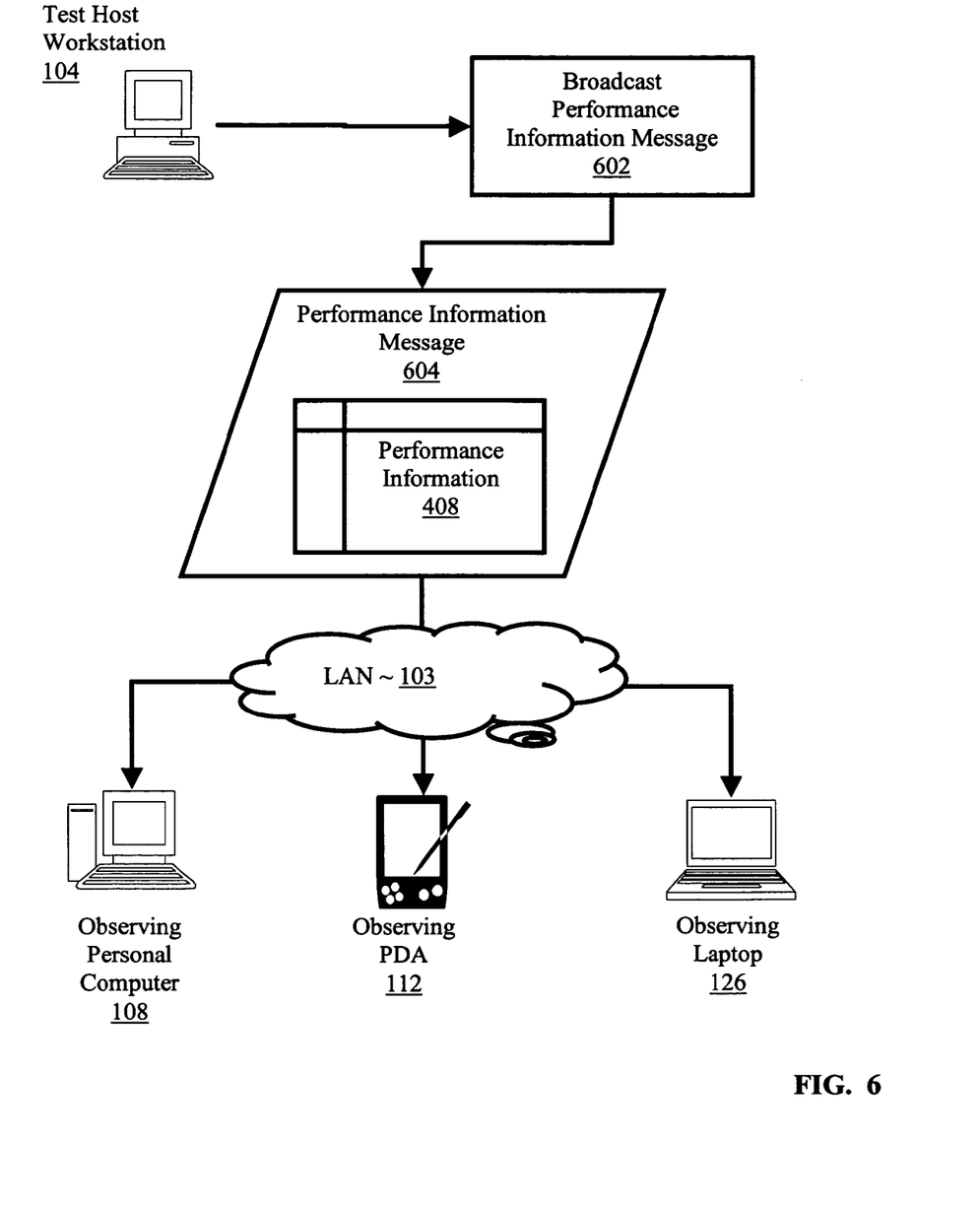
FIG. 6 sets forth a flow chart illustrating another exemplary method for receiving performance information useful in implementing peer-to-peer computer software installation.

In the example of FIG. 5, an observing host is configured with the network address of test hosts and sends one or more hosts a performance request message. In other embodiments, however, such a request message is avoided. For further explanation, the method of FIG. 6 sets forth a flow chart illustrating another exemplary method for receiving performance information describing the performance of software installed on the test host that does not require an observing host to request the performance information. The method of FIG. 6 instead includes broadcasting (602) a performance information message (604) to a plurality of observing install agent running on a plurality of observing hosts (108, 112, and 126). In the method of FIG. 6 the test host is configured to periodically broadcast to all observing hosts on a LAN (103) performance information describing the performance of software installed on the test host. In such embodiments, the observing hosts receive the performance information without having to make requests for such performance information. In the example of FIG. 6, a receiving observing install agent running on the observing host determines whether the performance information for software running on the test host meets performance criteria for the observing host. If the performance information for software running on the test host meets performance criteria for the observing host, the install agent on the observing host may continue by downloading from the test host the software.

The example of FIG. 5 allows install agents simultaneously operating as both test install agents and observing install agents to periodically broadcast performance information messages to all other install agents on the network also simultaneously operating as both test install agents and observing install agents. In such embodiments, each install agent is periodically provided with performance information from all other install agents on the network and such install agents determined whether uninstalled software or upgrades are operating within the network that meet their performance criteria and are available for download and installation to their host.

Each install agent may be configured individually by a system administrator to periodically broadcast a performance information messages in host specific time intervals. Such individual configuration provides increased flexibility in the implementation of peer-to-peer software installation.

Continuing again with reference to FIG. 3: The method of FIG. 3 includes determining (424), by the observing install agent, whether the performance information (408) meets performance criteria (422) for the observing host (126). In the example of FIG. 3 performance criteria (422) is represented by a data structure that contains host-specific performance criteria used to determine whether the performance information describing the software installed on the test host meets performance standards of the observing host. Host-specific performance criteria advantageously provides flexibility to system administrators by allowing different host to install new software under different conditions.

A system administrator typically configures each install agent on each host on a network with its performance criteria. In some embodiments, system administrators provide performance criteria classes and assign a host to a particular performance criteria class. In such embodiments, each host so assigned is given the same performance criteria as other hosts in its class. Alternatively, each host can be manually configured with individualized performance criteria for evaluating software installed on other hosts.

In the method of FIG. 3, determining whether the performance information meets performance criteria for the observing host may be carried out by comparing the performance information describing the performance of software installed on the test host with performance thresholds for an observing host on which the observing install agent is installed. The exemplary performance criteria (422) of FIG. 3 include an error threshold (430). An error threshold is typically a value that represents a maximum number of errors experienced by a test host running the software beyond which the observing host will not install the software. If a test host running the software experiences more than the threshold number of errors, the observing host will not install the software.

The exemplary performance criteria for the observing host of FIG. 3 also include an error frequency threshold (432). An error frequency threshold is typically a value that represents a maximum number of errors in a given time period (434) experienced by a test host running the software beyond which the observing host will not install the software. If a test host running the software experiences more than the threshold frequency of errors, the observing host will not install the software (428).

The exemplary performance criteria for the observing host of FIG. 3 includes a period of time from the installation of the software on the test host. In some embodiments, an observing install agent will not install software that has not run on a test host for less than a given period of time.

Comparing the performance information describing the performance of software installed on the test host with thresholds for the observing host may be enhanced by providing rules that provide increased granularity in evaluating the performance information. In the method of FIG. 3 therefore, determining (424), by the observing install agent, whether the performance information (408) meets performance criteria (422) for the observing host (126) also includes determining (424), whether the performance information (408) meets performance criteria (422) for the observing host (126) in dependence upon a rule (435). Rules provide a plurality of specific criteria for evaluating performance information. Consider the following exemplary rule:

If period of time defined by current date and installation date is greater than two weeks; and
If total number of error is less than 10;
Then install software.

An install agent may implement the exemplary rule above by reading the install date field on the performance information describing software installed on the test host and determining the period of time since the installation of the software. If the period of time is less than two weeks an install agent implementing the rule does not install the software. If the period of time is greater than two weeks, an install agent continues to implement the rule by counting the total number of errors in an error list. If number of errors is greater than 10, an install agent implementing the rule does not install the software. If the number of errors is greater than 10, an install agent implementing the rule installs the software. Rules provide increased granularity in determining whether the performance information describing the performance of software meets (430) the performance criteria (422) for the observing host (126).

Rules also provide a vehicle for evaluating performance information for the same software running on different hosts. For further explanation consider another rule:

If performance information for software is received from at least 5 host; and
For all hosts:
If period of time defined by current date and installation date is greater than three weeks; and
If total number of errors is less than 5 on all hosts;
Then install the software.

An install agent implementing this exemplary rule receives performance information for the same software from at least 5 hosts. The install agent implementing this rule receives the performance information from each host and determines if period of time defined by current date and installation date is greater than three weeks for each host and if the total number of errors experience by each host is less than 5. If the period of time defined by current date and installation date is greater than three weeks for any host and if the total number of errors experience by any host is greater than 5 the install agent does not install the software. If period of time defined by current date and installation date is greater than three weeks for all hosts and if the total number of errors experience by all hosts is less than 5 then the install agent installs the software.

Rules also provide a vehicle for software specific performance criteria. For further explanation, consider another rule:

If software is bos.net; and
Total errors is less than 5;
Install bos.net
If software is webSM;
Install webSM.

An install agent implementing the software specific rule above determines whether the performance information describes the exemplary software 'bos.net.' If the performance information describes bos.net, then the install agent implementing this rule determines whether the total number errors experienced by the test host is less than five. If the total number of errors experienced by the test host is greater than five, the install agent implementing this rule does not install the software. If the total number of errors experienced by this test host is less than five, the install agent implementing this rule installs the software. An install agent implementing this software specific rule also determines whether the performance information describes the exemplary software 'webSM' ('Web Survey Methodology'). If the performance information does not describe webSM, then the install agent implementing this rule does not install the software. If the performance information describes webSM, then the install agent implementing this rule installs the software.

If the performance information (408) meets (430) the performance criteria (422) for the observing host (126), the method of FIG. 3 includes downloading (425) the software (402) from the test host (104) and installing (426) the software (402) on the observing host (126). Installing (426) the software (402) on the observing host (126) may be carried out by downloading to the observing host from the test host (104) the software and an installation wizard designed for installation of the software and installing the software with the aid of the install wizard. Installing the software on the test host by use of an installation wizard is described for explanation and not a limitation. In fact, all methods of installing software are well within the scope of the present invention.

In the example of FIG. 3, installing (426) the software (402) on the observing host (126) includes downloading the software from the test host. Alternatively, installing (426) the software (402) on the observing host (126) may be carried out by downloading to the observing host from a known network location on a server supporting distribution of the software. In such examples, an installation wizard designed for installation of the software may also be designed from such a network location of use in installing the software.

In still another implementation, installing (426) the software (402) on the observing host (126) may be carried out by notifying a system administrator that software running on a test host meets the performance criteria of the observing host. In such an example, a system administrator receiving such a notification manually installs the software on the observing host. Notifying a system administrator that software running on a test host meets the performance criteria of the observing host may be carried out by sending the system administrator an email message, a short message system message, instant messaging system message, or any other notification that will occur to those of skill in the art.

If the performance information (408) does not meet (432) the performance criteria (422) for the observing host (126), the method of FIG. 3 continues by not installing the software (402) on the observing host (126). That is, the observing host continues running software already installed on the observing host. The method of FIG. 3 therefore advantageously results in installing software on the observing host only if the software meets the performance criteria for the observing host.

Peer-to-peer software installation advantageously provides a number of benefits including:

Simplicity. Peer-to-peer software installation recreates the role of a system administrator without requiring system administrator intervention.

Consistency. Peer-to-peer software installation provides a standardized method for propagating updates and software installation throughout a large cluster of machines.

Layered Install Architecture. Peer-to-peer software installation provides a vehicle for designating machines as test hosts and observing hosts. A system administrator can define one master test host, which is the only machine the system administrator manually installs software on. Then the system administrator can define another tier of test hosts that automatically install what is on the first test host, independent of any reliability measures. Then another layer of observing hosts watch the test hosts and still another final layer that waits for 90% of the hosts to install the software before the final layer installing the software.

Flexibility. Each host can have its own update criteria. A system administrator can set an office host to update once 50% of the hosts in a designated area have a particular update.

Fault tolerance. No master installation server is required to decide whether to install software and therefore there is no central machine to crash. The performance information is distributed throughout the network and maintained by each host.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for peer-to-peer computer software installation, the method comprising:

receiving, by an observing install agent running on an observing host from a test install agent running on a test host, performance information describing the performance of software installed on the test host, wherein an install agent comprises software running on a first computer host for:

installing software on the first computer host;

maintaining performance information describing performance of the software installed on the first computer host;

requesting performance information from a second computer host describing the performance of software installed on the second computer host; responding to requests from a second computer host for performance information describing the performance of software installed on the first computer host;

determining whether the performance information describing software installed on a second computer host meets performance criteria of the first computer host, the performance criteria of the first computer host being distinct from performance criteria associated with the second computer host; and installing, on the first computer host, software installed on the second computer host if the performance information describing software installed on a second computer host meets performance criteria of the first computer host;

determining, by the observing install agent, whether the performance information meets performance criteria for the observing host, the performance criteria of the observing host being distinct from performance criteria associated with the test host; and if the performance information meets the performance criteria for the observing host, installing the software on the observing host.

2. The method of claim 1 wherein receiving performance information describing the performance of software installed on the test host further comprises:

sending, by an observing install agent running on an observing host to a test install agent running on a test host, a performance information request message; and receiving, by an observing install agent running on an observing host from a test install agent running on a test host, a performance information response message.

3. The method of claim 1 wherein receiving performance information describing the performance of software installed on the test host further comprises broadcasting a performance information message to a plurality of observing install agent running on a plurality of observing hosts.

4. The method of claim 1 wherein determining, by the observing install agent, whether the performance information meets performance criteria for the observing host further comprises determining, whether the performance information meets performance criteria for the observing host in dependence upon a rule.

5. The method of claim 1 further comprising:
installing software on the test host;
maintaining, by the test install agent, performance information describing performance of software installed on the test host.

6. The method of claim 5 wherein maintaining, by the test install agent, performance information describing performance of software installed on the test host further comprises:
identifying an error in the performance of the software; and
recording a description of the error.

7. The method of claim 1 wherein installing the software on the observing host further comprises downloading the software from the test host.

8. A system for peer-to-peer computer software installation, the system comprising:
means for receiving, by an observing install agent running on an observing host from a test install agent running on a test host, performance information describing the performance of software installed on the test host, wherein an install agent comprises software running on a first computer host for:
installing software on the first computer host;
maintaining performance information describing performance of the software installed on the first computer host;
requesting performance information from a second computer host describing the performance of software installed on the second computer host;
responding to requests from a second computer host for performance information describing the performance of software installed on the first computer host;
determining whether the performance information describing software installed on a second computer host meets performance criteria of the first computer host, the performance criteria of the first computer host being distinct from performance criteria associated with the second computer host; and
installing, on the first computer host, software installed on the second computer host if the performance information describing software installed on a second computer host meets performance criteria of the first computer host;
means for determining, by the observing install agent, whether the performance information meets performance criteria for the observing host, the performance criteria of the observing host being distinct from performance criteria associated with the test host; and
means for installing the software on the observing host.

9. The system of claim 8 wherein means for receiving performance information describing the performance of software installed on the test host further comprises:
means for sending, by an observing install agent running on an observing host to a test install agent running on a test host, a performance information request message; and
means for receiving, by an observing install agent running on an observing host from a test install agent running on a test host, a performance information response message.

10. The system of claim 8 wherein means for receiving performance information describing the performance of software installed on the test host further comprises means for broadcasting a performance information message to a plurality of observing install agent running on a plurality of observing hosts.

11. The system of claim 8 wherein means for determining, by the observing install agent, whether the performance information meets performance criteria for the observing host further comprises means for
determining, whether the performance information meets performance criteria for the observing host in dependence upon a rule.

12. The system of claim 8 further comprising:
means for installing software on the test host;
means for maintaining, by the test install agent, performance information describing performance of software installed on the test host.

13. The system of claim 12 wherein means for maintaining, by the test install agent, performance information describing performance of software installed on the test host further comprises:
means for identifying an error in the performance of the software; and
means for recording a description of the error.

14. The system of claim 8 wherein means for installing the software on the observing host further comprises means for downloading the software from the test host.

15. A computer program product for peer-to-peer computer software installation, the computer program product comprising:
a recording medium;
means, recorded on the recording medium, for receiving, by an observing install agent running on an observing host from a test install agent running on a test host, performance information describing the performance of software installed on the test host, wherein an install agent comprises software running on a first computer host for:
installing software on the first computer host;
maintaining performance information describing performance of the software installed on the first computer host;
requesting performance information from a second computer host describing the performance of software installed on the second computer host;
responding to requests from a second computer host for performance information describing the performance of software installed on the first computer host;
determining whether the performance information describing software installed on a second computer host meets performance criteria of the first computer host, the performance criteria of the first computer host being distinct from performance criteria associated with the second computer host; and
installing, on the first computer host, software installed on the second computer host if the performance information describing software installed on a second computer host meets performance criteria of the first computer host;
means, recorded on the recording medium, for determining, by the observing install agent, whether the performance information meets performance criteria for the observing host, the performance criteria of the observing host being distinct from performance criteria associated with the test host; and
means, recorded on the recording medium, for installing the software on the observing host.

16. The computer program product of claim 15 wherein means, recorded on the recording medium, for receiving performance information describing the performance of software installed on the test host further comprises:
- means, recorded on the recording medium, for sending, by an observing install agent running on an observing host to a test install agent running on a test host, a performance information request message; and
- means, recorded on the recording medium, for receiving, by an observing install agent running on an observing host from a test install agent running on a test host, a performance information response message.

17. The computer program product of claim 15 wherein means, recorded on the recording medium, for receiving performance information describing the performance of software installed on the test host further comprises means, recorded on the recording medium, for broadcasting a performance information message to a plurality of observing install agent running on a plurality of observing hosts.

18. The computer program product of claim 15 wherein means, recorded on the recording medium, for determining, by the observing install agent, whether the performance information meets performance criteria for the observing host further comprises means, recorded on the recording medium, for determining, whether the performance information meets performance criteria for the observing host in dependence upon a rule.

19. The computer program product of claim 15 further comprising:
- means, recorded on the recording medium, for installing software on the test host;
- means, recorded on the recording medium, for maintaining, by the test install agent, performance information describing performance of software installed on the test host.

20. The computer program product of claim 19 wherein means, recorded on the recording medium, for maintaining, by the test install agent, performance information describing performance of software installed on the test host further comprises:
- means, recorded on the recording medium, for identifying an error in the performance of the software; and
- means, recorded on the recording medium, for recording a description of the error.

* * * * *